(12) United States Patent
Nguyen Canh et al.

(10) Patent No.: US 12,536,708 B2
(45) Date of Patent: Jan. 27, 2026

(54) METHOD AND APPARATUS TO ENCODE MESH BASED ON SYMMETRY PROPERTY

(71) Applicant: Tencent America LLC, Palo Alto, CA (US)

(72) Inventors: Thuong Nguyen Canh, Palo Alto, CA (US); Xiaozhong Xu, Palo Alto, CA (US); Chao Huang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 117 days.

(21) Appl. No.: 18/634,367

(22) Filed: Apr. 12, 2024

(65) Prior Publication Data

US 2024/0346703 A1 Oct. 17, 2024

Related U.S. Application Data

(60) Provisional application No. 63/459,225, filed on Apr. 13, 2023.

(51) Int. Cl.
*G06T 9/00* (2006.01)
*G06T 7/40* (2017.01)
*G06T 7/68* (2017.01)

(52) U.S. Cl.
CPC ............ *G06T 9/001* (2013.01); *G06T 7/40* (2013.01); *G06T 7/68* (2017.01)

(58) Field of Classification Search
None
See application file for complete search history.

(56) References Cited

U.S. PATENT DOCUMENTS

| | | | | |
|---|---|---|---|---|
| 2006/0284880 | A1* | 12/2006 | Zhou | G06T 15/04 345/582 |
| 2015/0325044 | A1* | 11/2015 | Lebovitz | G06T 15/04 345/420 |
| 2018/0253867 | A1* | 9/2018 | Laroche | G06T 17/20 |
| 2020/0265552 | A1* | 8/2020 | Hemmer | G06T 17/205 |
| 2020/0410752 | A1* | 12/2020 | Jiang | G06T 15/20 |

(Continued)

OTHER PUBLICATIONS

International Search Report dated Jul. 30, 2024 from the International Searching Authority in Application No. PCT/US2024/24605.

(Continued)

*Primary Examiner* — James A Thompson
(74) *Attorney, Agent, or Firm* — Sughrue Mion, PLLC (57) ABSTRACT

A method includes determining a symmetry plane that the divides a mesh into a first side and a second side opposite the first side; performing, on the first side of the mesh, a decimation process to generate a decimated first side of the mesh; performing UV reparameterization on the decimated first side of the mesh to generate a first side UV reparameterized mesh; performing texture transfer on the first side UV reparameterized mesh to generate a first side texture image; determining whether the first side texture image exhibits a degree of texture symmetry with the second side of the mesh that satisfies a condition; and based on a determination that the condition is not satisfied, performing a symmetry texture transfer process between a first texture coordinate on the first side and a second texture coordinate on the second side.

20 Claims, 6 Drawing Sheets

(56) References Cited

U.S. PATENT DOCUMENTS

| | | |
|---|---|---|
| 2021/0335039 A1 | 10/2021 | Jones et al. |
| 2022/0068007 A1 | 3/2022 | Lafer et al. |
| 2023/0410374 A1* | 12/2023 | Ahn ........................ G06T 9/001 |
| 2024/0153150 A1* | 5/2024 | Kim ..................... H04N 19/597 |
| 2024/0233192 A1* | 7/2024 | Cao ........................ G06T 9/001 |
| 2025/0139835 A1* | 5/2025 | Marvie ................... G06T 15/04 |

OTHER PUBLICATIONS

Written Opinion dated Jul. 30, 2024 in from the International Searching Authority in Application No. PCT/US2024/24605.

* cited by examiner

METHOD AND APPARATUS TO ENCODE MESH BASED ON SYMMETRY PROPERTY

CROSS-REFERENCE TO RELATED APPLICATION

This application claims priority from U.S. Provisional Application No. 63/459,225 filed on Apr. 13, 2023, the disclosure of which is incorporated herein by reference in its entirety.

FIELD

This disclosure is directed to a set of advanced video coding technologies. More specifically, the present disclosure is directed to a method and apparatus to encode a mesh based on a symmetry property.

BACKGROUND

VMesh is an ongoing MPEG standard to compress dynamic meshes. The current VMesh reference software compresses meshes based on decimated base meshes, displacements vectors and motion fields. The displacements are calculated by searching the closest point on the input mesh with respect to each vertex of the subdivided based mesh. To encode the displacement, displacement vectors are transformed into wavelet coefficients by a linear lifting scheme, and then the coefficients are quantized and coded by a video codec or arithmetic codec. This process also refines the base mesh to minimize the displacement. Texture transfer may be performed to match the texture with reparameterized geometry and UV as well as optimized texture for image compression.

Reflection symmetry is a popular characteristic of mesh coding, especially computer generated meshes. Symmetry was utilized to compress symmetry mesh. Vertices are divided into a left and right part of a symmetry plane. The left part is encoded by mesh coding while the right part is encoded by a symmetry prediction and displacement coding. Even though the texture coordinate (or UV attribute) also has a certain level of symmetry, there may be a difference in symmetry property like transition and rotation. However, texture coordinate compression for symmetry mesh have not been exploited yet.

A static mesh often has associated texture images which are compressed by image compression standard or intra coding of video compression standard. These standards mainly focus on local characteristics of image to compress like the high correlation of a nearby pixels or image blocks, but often ignore the global characteristic such as symmetry of images. In addition, image coding is constrained to maintain same structure between the input and decoded output images. Therefore, texture transfer is performed to make texture image more favourable for image coding. However, the global characteristic like symmetry of mesh is still ignored.

SUMMARY

According to one or more embodiments, a method performed by at least one processor of an encoder, the method includes: determining a symmetry plane that the divides a mesh into a first side and a second side opposite the first side; performing, on the first side of the mesh, a decimation process based on one or more symmetrical properties of the mesh to generate a decimated first side of the mesh; performing UV reparameterization on the decimated first side of the mesh to generate a first side UV reparameterized mesh; performing texture transfer on the first side UV reparameterized mesh based on each texture coordinate on the first side of the mesh to generate a first side texture image; determining whether the first side texture image exhibits a degree of texture symmetry with the second side of the mesh that satisfies a condition; based on a determination that the condition is not satisfied, performing a symmetry texture transfer process between a first texture coordinate on the first side and a second texture coordinate on the second side; and generating a bitstream including each texture coordinate located on the first side of the mesh.

According to one or more embodiments, a method performed by at least one processor of an encoder includes: generating a bitstream including each encoded texture coordinate located on a first side of a mesh, wherein the mesh is divided into the first side and a second side opposite the first side by a symmetry plane, wherein a decimation process is performed on the first side of the mesh based on one or more symmetrical properties of the mesh to generate a decimated first side of the mesh, wherein UV reparameterization is performed on the decimated first side of the mesh to generate a first side UV reparameterized mesh, wherein texture transfer is performed on the first side UV reparameterized mesh based on each texture cording on the first side of the mesh to generate a first side texture image, wherein whether the first side texture image exhibits a degree of texture symmetry with the second side of the mesh that satisfies a condition is determined, wherein based on a determination that the condition is not satisfied, a symmetry texture transfer process between a first texture coordinate on the first side and a second texture coordinate on the second side is performed, and wherein a bitstream including each texture coordinate located on the first side of the mesh is generated.

According to one or more embodiments, a method performed by at least one processor of a decoder includes receiving a bitstream comprising an encoded texture coordinates on a first side of a mesh divided according to a symmetry plane that divides the mesh into the first side and a second side opposite to the first side; decoding each encoded texture coordinate on the first side of the mesh; decoding an indicator included in the bitstream that is set to a value that indicates whether the first side of the mesh exhibits a degree of texture symmetry with the second side of the mesh that satisfies a condition; and decoding, based on the decoded indicator, a second texture coordinate on the second side of the mesh based on a decoded first texture coordinate on the first side of the mesh.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 1:
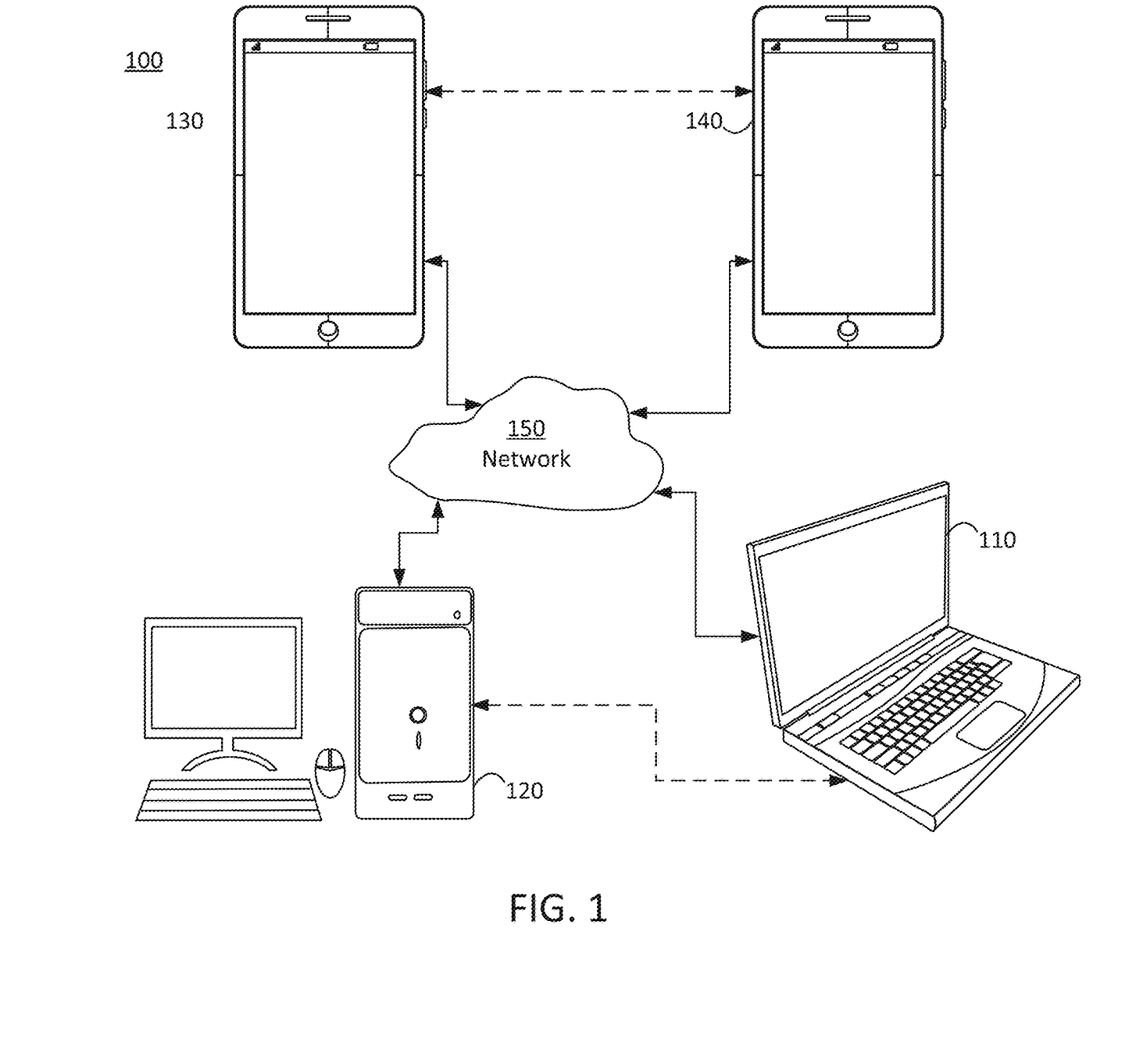
FIG. 1 is a schematic illustration of a block diagram of a communication system, in accordance with embodiments of the present disclosure.
Figure 2:
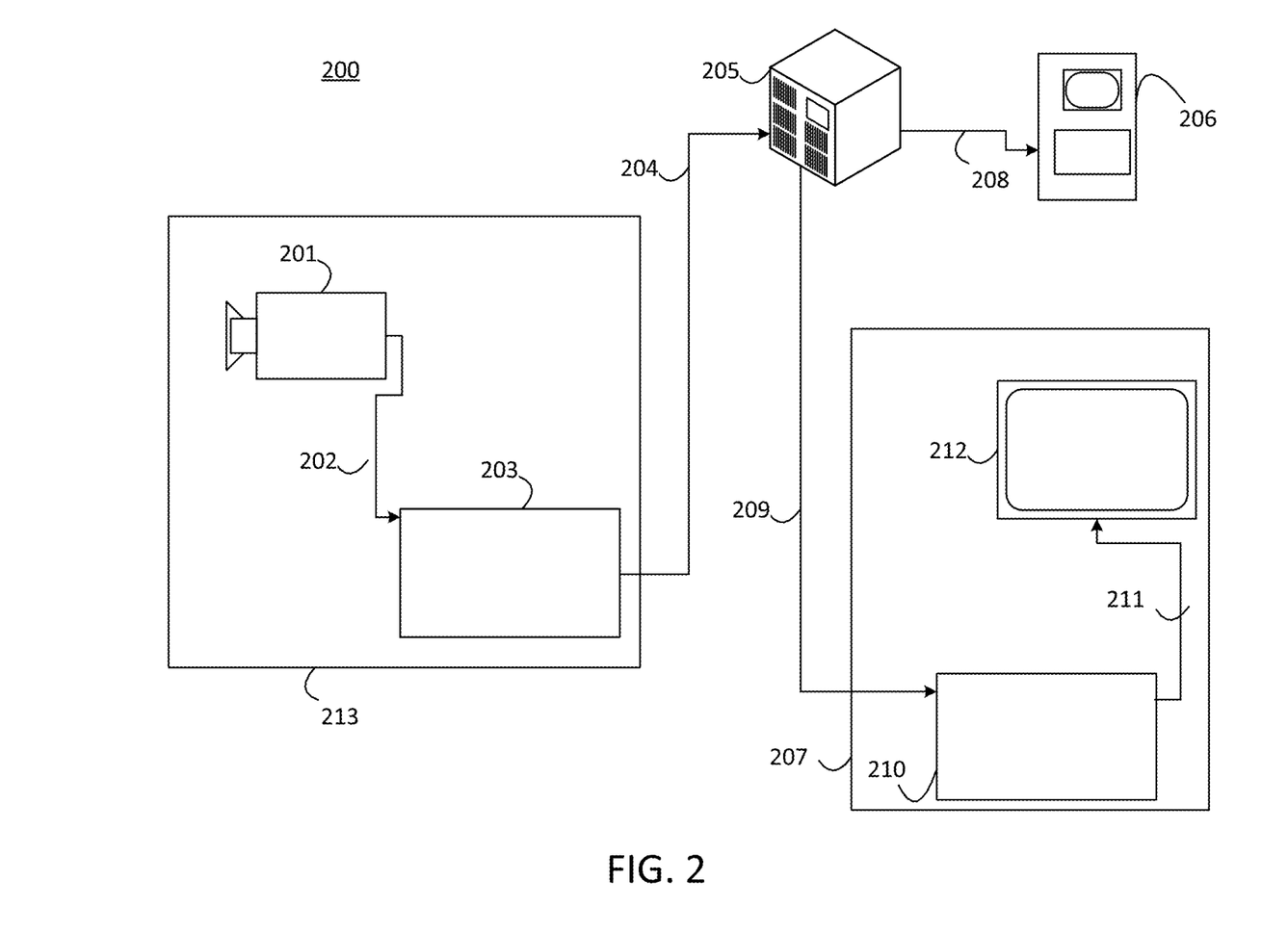
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 and 207 may access the streaming server 205 to retrieve video bit streams 208 and 209, respectively that may be copies of the encoded video bitstream 204.

The streaming clients 207 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 208, and 209 may be encoded according to certain video coding/compression standards.

Embodiments of the present disclosure directed to utilizing geometric symmetry of polygon meshes to enhance texture encoding. The embodiments of the present disclosure are applicable for meshes that exhibit complete or partial symmetry. The texture transfer technique described herein aims to improve the efficiency of encoding and decoding processes. For example, UV attributes and associated texture have a certain level of symmetry. The embodiments of the present disclosure utilize symmetry in texture to improve the texture coding efficiency.

Figure 3:
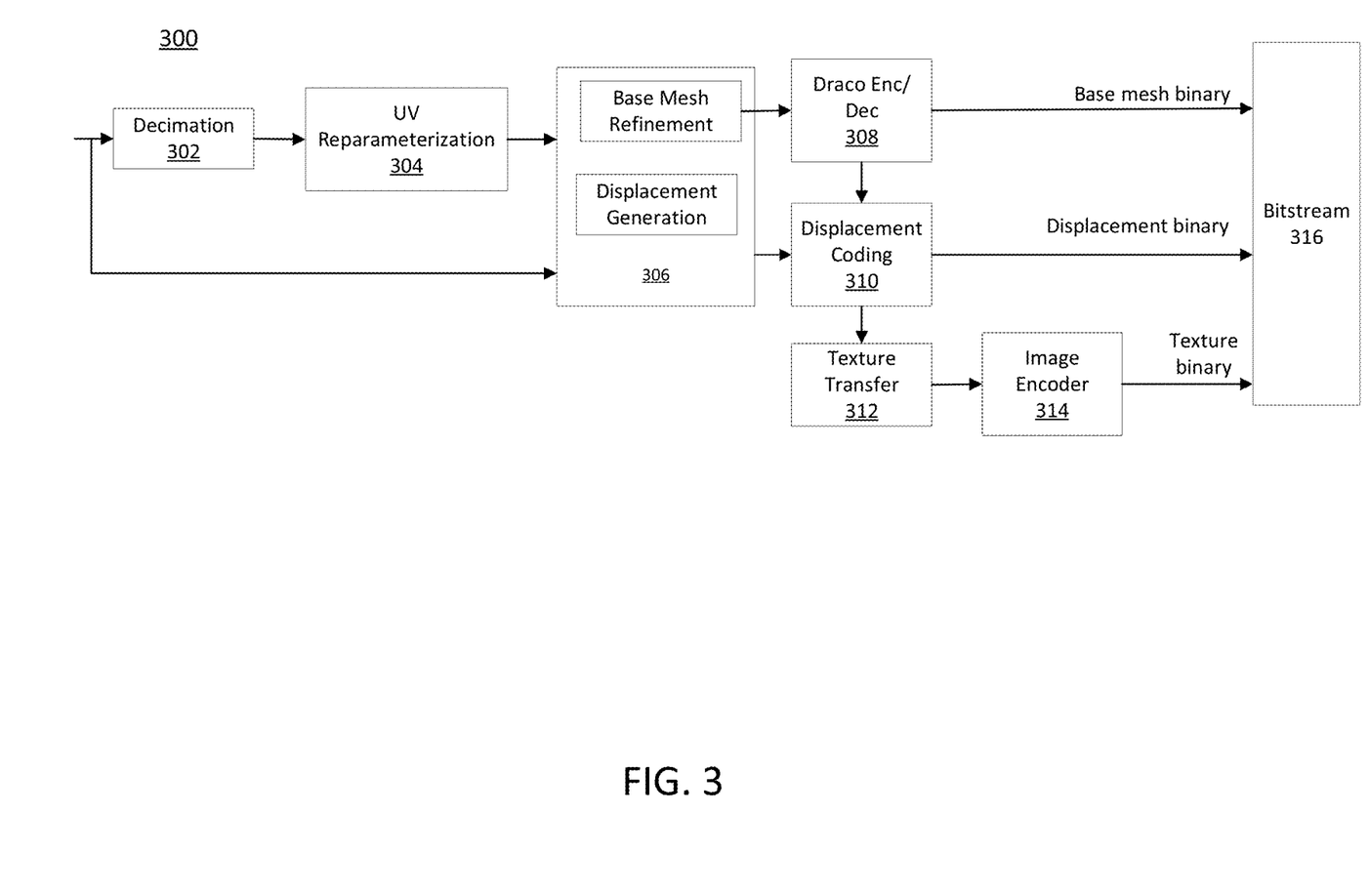
FIG. 3 is a schematic illustration of an example mesh encoder, in accordance with embodiments of the present disclosure.

FIG. 3 illustrates an example mesh encoder 300. The encoder 300 may perform the V-DMC process for performing decimation and reparameterization before encoding a bitstream. As illustrated in FIG. 3, an input mesh may be subject to decimation 302 and UV reparameterization 304. Subsequently geometry reparameterization 306 is performed that includes base mesh refinement and displacement generation. The output of the base mesh refinement is provided to a Draco encoder 308 to generate a base mesh binary. The output of the displacement generation is provided to displacement coding 310 to generate displacement binary. The output of displacement coding 310 is provided to texture transfer 312 and image encoder 314 to generate texture binary. The base mesh binary, texture binary, and displacement binary may be included in bitstream 316. In one or more examples, texture coordinates or UV coordinates (often shortened to UVs) map the vertices to locations on the textures through a process called "UV Mapping". The UVs define a 2D position in texture space for each vertex in the mesh.

According to one or more embodiments, a method to compress surface symmetry mesh $\mathcal{M}$ may be performed as follows. In one or more examples, a decimation process in Vmesh may be replaced with a symmetry decimation process with symmetry displacement coding, and geometry reparameterization is also updated to reflect the symmetry base mesh. As a result, significant bit savings are achieved by encoding only half of the base mesh.

According to one or more embodiments, given a symmetry mesh $\mathcal{M}$, let the mirror symmetry plane p divide the vertices $v$ into three sets: left vertices $v_\mathcal{L}$ and texture coordinate $\mathcal{U}_\mathcal{L}$, right vertices $v_\mathcal{R}$ with texture coordinate $\mathcal{U}_\mathcal{R}$, and symmetry plane vertices $v_\mathcal{J}$ with plane texture coordinate $\mathcal{U}_\mathcal{J}$. Similarly, plane p divides the faces $\mathcal{F}$ into left faces $\mathcal{F}_\mathcal{L}$, right faces $\mathcal{F}_\mathcal{R}$, and cross symmetry plane faces $\mathcal{F}_\mathcal{C}$. In one or more examples, a symmetry M is considered complete when all left vertices have a corresponding symmetry pair in the set of right vertices (e.g., $\{v_\mathcal{L}{}^i, v_\mathcal{R}{}^i\}$). In one or more examples, each associated texture coordinates in the left set also has a corresponding pair in the right set (e.g., $\{\mathcal{U}_\mathcal{L}{}^i, \mathcal{U}_\mathcal{R}{}^i\}$). In one or more examples, plane vertices and texture coordinates are self-pair.

Figure 4A:
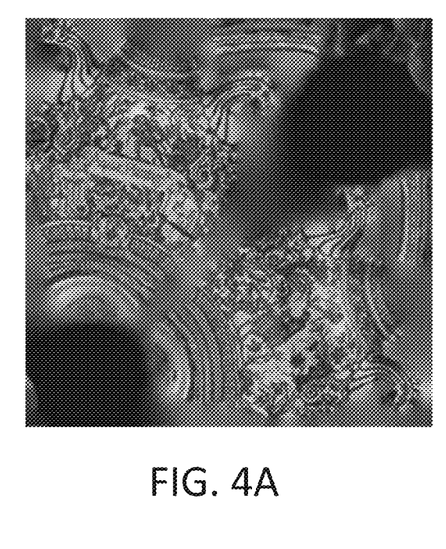
FIGS. 4A and 4B illustrate an example of texture transfer for symmetry texture, in accordance with embodiments of the present disclosure.
Figure 4B:
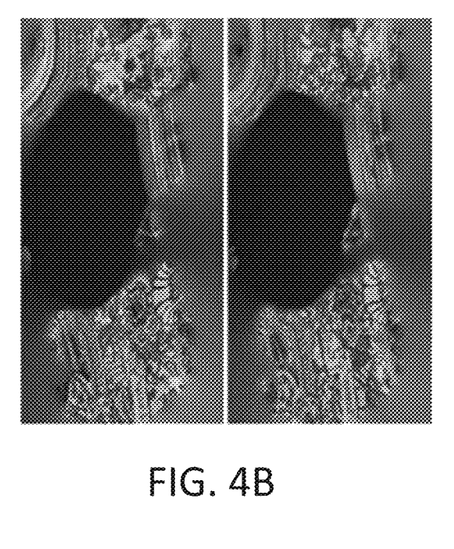

According to one or more embodiments, during the encoding stage, the left-side texture coordinates $\{\mathcal{U}_\mathcal{L}{}^i\}$ are parameterized, and texture transfer is used with tools such UVAtlas to generate a new left texture image. For example, UVAtlas may be used on texture coordinate $\{\mathcal{U}_\mathcal{L}{}^i\}$ to reparameterize (e.g., adjust) this texture coordinate based on texture values of adjacent coordinates located on the left side of the mesh. The right-side texture coordinates are transferred based on the left-side texture coordinates, resulting in a visually similar texture structure, as depicted in FIGS. 4A and 4B. FIG. 4A illustrates the original texture 400 and FIG. 4B illustrates the left transferred texture 402 and the right transferred texture 404.

According to one or more embodiments, the left and right texture images are treated as a two-frame video sequence, with the left and right transferred textures at frame indices 0 and 1, respectively. A video codec with inter-prediction is employed instead of the conventional intra-frame encoding. This approach capitalizes on the spatial distance correlation within symmetric textures, which is not possible in conventional intra-coding for the entire image. Furthermore, texture coordinate compression is achieved by encoding only the left texture coordinates. In a separate embodiment, the two parts of texture images can be put together as a single image. In this case, the right-side texture coordinates need to add an offset to reflect its corresponding positions in the texture image.

According to one or more embodiments, at the decoding stage, after decoding the left-side mesh with decoded left texture coordinates $\{\hat{u}_\mathcal{L}{}^i\}$ and texture video to left and right images, the texture coordinates of the right side are predicted as:

$$\hat{u}_\mathcal{R}^i = \hat{u}_\mathcal{L}^i.$$

However, these predicted coordinates point to the right image instead of the left. This efficient encoding and decoding process leverages the inherent symmetry of the mesh, resulting in improved texture encoding.

According to one or more embodiments, when the input mesh exhibits perfect symmetry in its texture (e.g., each left texture coordinate is identical to a corresponding symmetric right texture coordinate), the may be further optimized to reduce the encoding and decoding complexity by only encoding the left textured mesh as follows.

Operation 1. Symmetry detection: Analyze the input mesh to identify if it has perfect symmetry in its texture.

Perfect symmetry implies that the texture transferred left, and right texture images are identical, allowing for more efficient encoding.

Operation 2. Signal bit transmission: If perfect symmetry is detected, transmit a single bit as a flag to signal the decoder that only the left mesh and texture will be encoded.

Operation 3. Encoding left mesh: Encode only the left mesh and its corresponding transferred texture images. Since the right texture is identical to the left, there is no need to encode it separately, which results in significant signalling overhead for the texture encoding with video codec. Accordingly, since the right texture is identical to the left texture, the transfer of the texture from the left to the right is not needed.

Operation 4. Decoding: At the decoding stage, upon receiving the signal bit indicating perfect symmetry, the decoder reconstructs the right mesh and texture by mirroring the decoded left mesh and reuse the left texture. In this case the decoded texture coordinates of the right side after de-quantization are:

$$\hat{u}_R^i = \hat{u}_L^i + 1.$$

In the above equation, the texture coordinate values may be cyclic. For example, a texture value of 0.1 may be equal to 1.1. Thus, adding 1 to 0.1 may result in achieving the same texture value.

According to one or more embodiments, the texture transfer method is adapted to handle input meshes with multiple submeshes. The input mesh may be first divided into multiple submeshes, each associated with its own symmetry plane. The proposed texture transfer method is then applied to each submesh independently, as follows.

For each submesh, the corresponding symmetry plane that separates the vertices and texture coordinates into left and right sets is identified.

For each submesh, the symmetry-based reparameterization and texture transfer as described above for the left and right texture coordinates within each submesh is applied.

The left and right texture images of each submesh may be processed as a two-frame video sequence, employing the inter-prediction video codec for improved compression.

Figure 5:
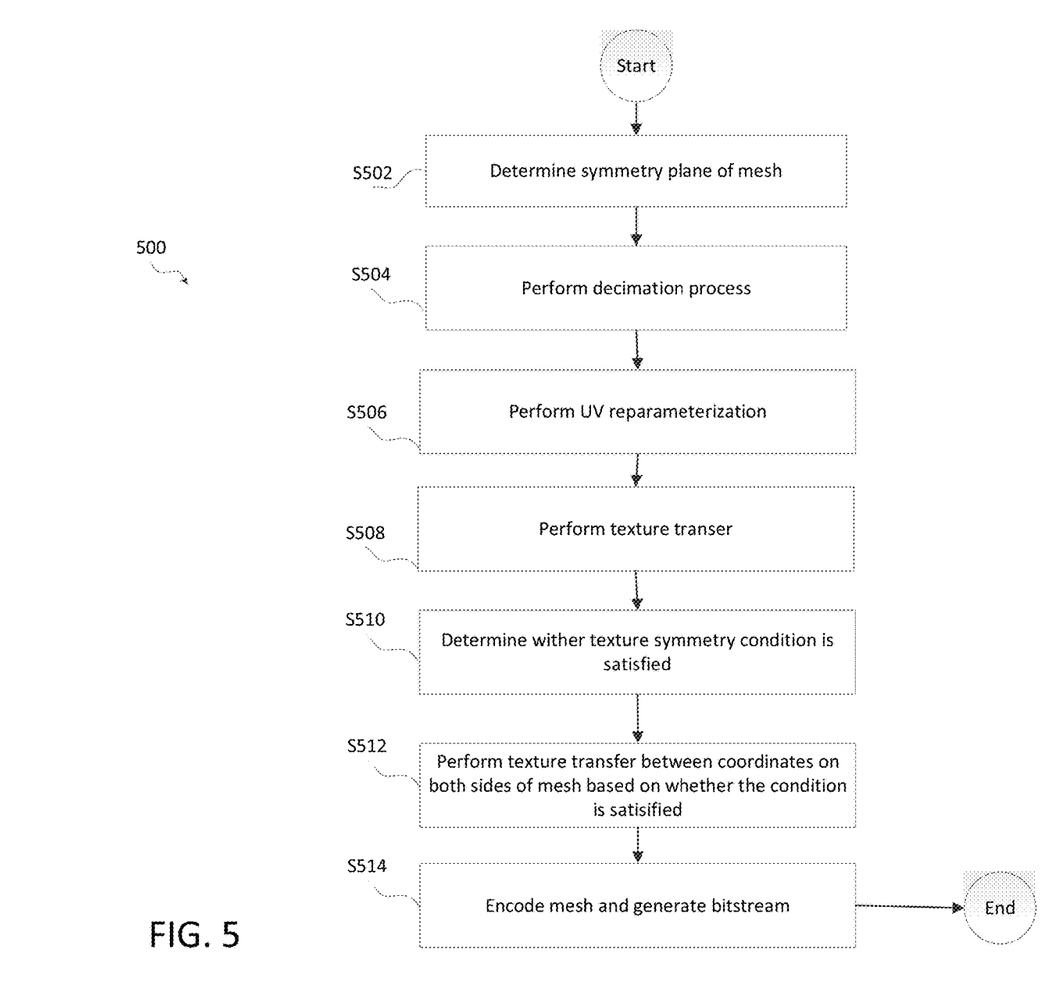
FIG. 5 is a flowchart of an example process for performing texture transfer for symmetry texture, in accordance with embodiments of the present disclosure.

FIG. 5 is a flowchart of an example process 500 for transferring a texture. The process f00 may be performed by an encoder 203 and 300.

The process 600 may start at operation S502 where a symmetry plane of a mesh may be determined. For examples, a symmetry plane of the mesh illustrated in FIG. 4A may be determined that divides the mesh into a left side and a right side.

The process proceeds to operation S504 where a decimation process is performed. For example, the decimation process 302 may be performed on the left side of the mesh.

The process proceeds to operation S506 where a UV reparameterization process is performed.

The process proceeds to operation S508 where a texture transfer is performed.

The process proceeds to operation S510 where a determination is made if a texture symmetry condition is satisfied. For example, the texture symmetry condition may specify that a texture on the left side of a mesh is identical to a right side of the mesh.

The process may proceeds to operation S512 where texture transfer between coordinates on the left side of the mesh to the right side of the mesh is performed based on whether the condition is satisfied. For example, if the condition is not satisfied, the left and right sides of the mesh may be treated as different frames in which an inter-prediction method is used as described above, or the left side may be encoded with an offset for each coordinate that points to a corresponding coordinate on the right side. In another example, if the condition is satisfied (e.g., the texture of the left side of the mesh is identical to the right side of the mesh), the left sided texture is encoded and copied to the right side during decoding and reconstruction.

The process proceeds to operation S514 where the mesh is encoded and a bitstream is generated.

The techniques, described above, may be implemented as computer software using computer-readable instructions and physically stored in one or more computer-readable media. For example, FIG. 6 shows a computer system 600 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 6:
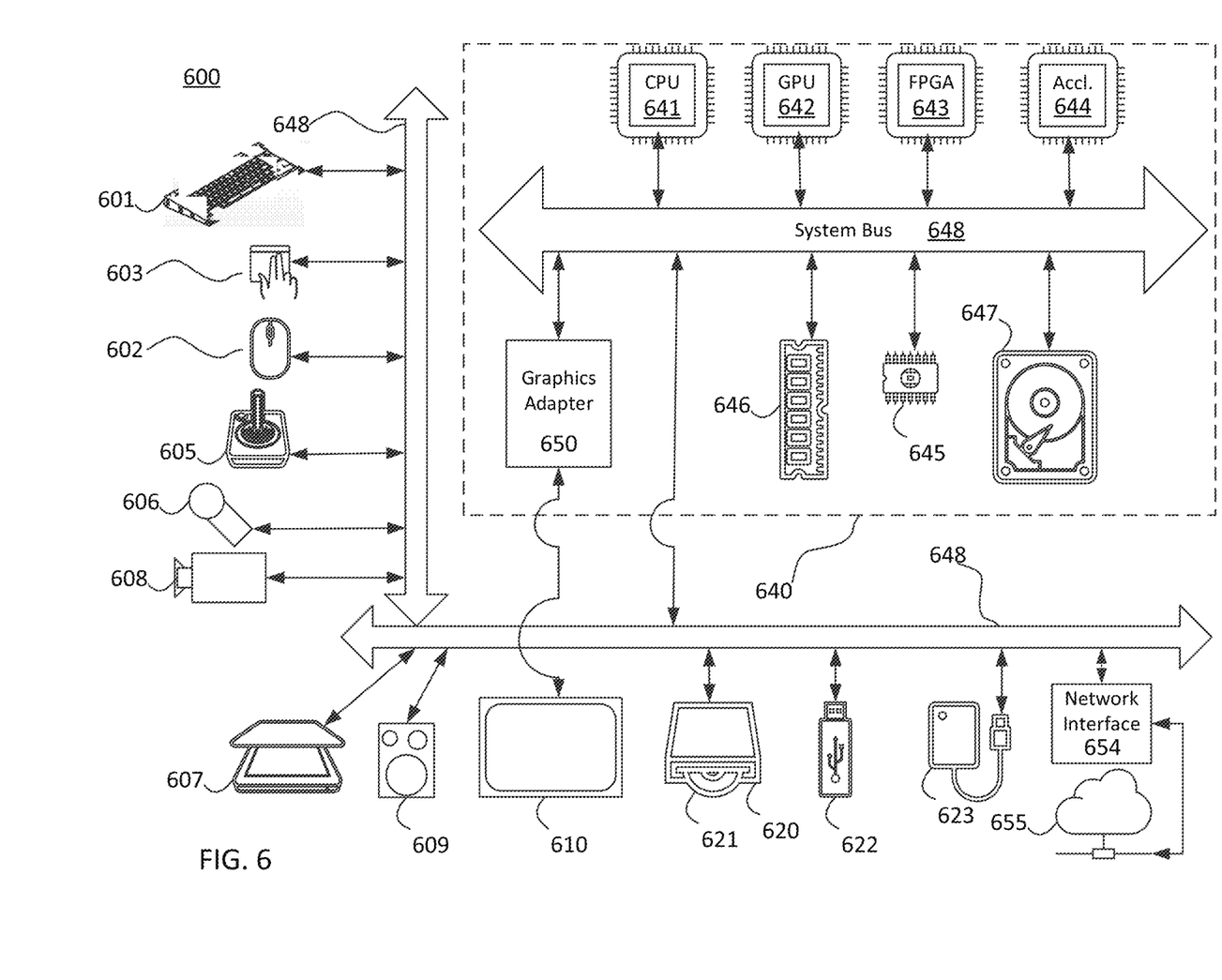
FIG. 6 is a diagram of a computer system suitable for implementing the embodiments of the present disclosure, in accordance with embodiment of the present disclosure.

The components shown in FIG. 6 for computer system 600 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data glove, or joystick 605, but there may also be tactile feedback devices that do not serve as input devices). For example, such devices may be audio output devices (such as: speakers 609, headphones (not depicted)), visual output devices (such as screens 610 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 600 may also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 649 (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks, computer system 600 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 655. Certain protocols and protocol stacks may be used on each of those networks and network interfaces as described above.

Aforementioned human interface devices, human-accessible storage devices, and network interfaces 654 may be attached to a core 640 of the computer system 600.

The core 640 may include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 may be accessible in the form of one or more physical plugs to enable extensions by additional CPUs, GPU, and the like. The peripheral devices may be attached either directly to the core's system bus 648, or through a peripheral bus 649. Architectures for a peripheral bus include PCI, USB, and the like. A graphics adapter 650 may be included in the core 640.

CPUs 641, GPUs 642, FPGAs 643, and accelerators 644 may execute certain instructions that, in combination, may make up the aforementioned computer code. That computer code may be stored in ROM 645 or RAM 646. Transitional data may be also be stored in RAM 646, whereas permanent data may be stored for example, in the internal mass storage 647. Fast storage and retrieve to any of the memory devices may be enabled through the use of cache memory, that may be closely associated with one or more CPU 641, GPU 642, mass storage 647, ROM 645, RAM 646, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 600, and specifically the core 640 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 640 that are of non-transitory nature, such as core-internal mass storage 647 or ROM 645. The software implementing various embodiments of the present disclosure may be stored in such devices and executed by core 640. A computer-readable medium may include one or more memory devices or chips, according to particular needs. The software may cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system may provide functionality as a result of logic hardwired or otherwise embodied in a circuit (for example: accelerator 644), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor of an encoder, the method comprising:
    determining a symmetry plane that the divides a mesh into a first side and a second side opposite the first side;
    performing, on the first side of the mesh, a decimation process based on one or more symmetrical properties of the mesh to generate a decimated first side of the mesh;

performing UV reparameterization on the decimated first side of the mesh to generate a first side UV reparameterized mesh;

performing texture transfer on the first side UV reparameterized mesh based on each texture coordinate on the first side of the mesh to generate a first side texture image; determining whether the first side texture image exhibits a degree of texture symmetry with the second side of the mesh that satisfies a condition;

based on a determination that the condition is not satisfied, performing a symmetry texture transfer process between a first texture coordinate on the first side and a second texture coordinate on the second side; and generating a bitstream including each texture coordinate located on the first side of the mesh.

2. The method according to claim 1, wherein the symmetry texture transfer process comprises predicting the second texture coordinate based on the first texture coordinate.

3. The method according to claim 2, wherein the symmetry texture transfer process further comprises encoding the first texture coordinate on the first side and the second texture coordinate on the second side in accordance with an inter-prediction method in which the first texture coordinate is processed as a first frame and the second texture coordinate is processed as a second frame.

4. The method according to claim 2, wherein the symmetry texture transfer process further comprises specifying an offset between the first texture coordinate and the second texture coordinate, wherein a position of the second texture coordinate in the mesh is determined based on the offset, wherein the offset is included in the bitstream.

5. The method according to claim 1, wherein the condition specifies that each texture coordinate on the first side of the mesh is identical to a corresponding texture coordinate on the second side of the mesh.

6. The method according to claim 5, further comprising:
based on a determination that the condition is satisfied, set an indicator in the bitstream to a value that indicates that each texture coordinate on the first side of the mesh is identical to a corresponding texture coordinate on the second side of the mesh.

7. The method according to claim 6, wherein based on a determination that the indicator in the bitstream indicates that each texture coordinate on the first side of the mesh is identical to a corresponding texture coordinate on the second side of the mesh, the second texture coordinate is determined based on adding an offset to the first texture coordinate.

8. The method according to claim 1, wherein the input mesh is one sub-mesh of a plurality of sub-meshes that comprise an entire mesh larger than the input mesh.

9. A method performed by at least one processor of an encoder, the method comprising:
generating a bitstream including each encoded texture coordinate located on a first side of a mesh,
wherein the mesh is divided into the first side and a second side opposite the first side by a symmetry plane,
wherein a decimation process is performed on the first side of the mesh based on one or more symmetrical properties of the mesh to generate a decimated first side of the mesh, wherein UV reparameterization is performed on the decimated first side of the mesh to generate a first side UV reparameterized mesh,
wherein texture transfer is performed on the first side UV reparameterized mesh based on each texture cording on the first side of the mesh to generate a first side texture image, wherein whether the first side texture image exhibits a degree of texture symmetry with the second side of the mesh that satisfies a condition is determined,
wherein based on a determination that the condition is not satisfied, a symmetry texture transfer process between a first texture coordinate on the first side and a second texture coordinate on the second side is performed, and
wherein a bitstream including each texture coordinate located on the first side of the mesh is generated.

10. The method according to claim 9, wherein the symmetry texture transfer process comprises predicting the second texture coordinate based on the first texture coordinate.

11. The method according to claim 10, wherein the symmetry texture transfer process further comprises encoding the first texture coordinate on the first side and the second texture coordinate on the second side in accordance with an inter-prediction method in which the first texture coordinate is processed as a first frame and the second texture coordinate is processed as a second frame.

12. The method according to claim 10, wherein the symmetry texture transfer process further comprises specifying an offset between the first texture coordinate and the second texture coordinate, wherein a position of the second texture coordinate in the mesh is determined based on the offset, wherein the offset is included in the bitstream.

13. The method according to claim 11, wherein the condition specifies that each texture coordinate on the first side of the mesh is identical to a corresponding texture coordinate on the second side of the mesh.

14. The method according to claim 13, wherein based on a determination that the condition is satisfied, an indicator in the bitstream is set to a value that indicates that each texture coordinate on the first side of the mesh is identical to a corresponding texture coordinate on the second side of the mesh.

15. The method according to claim 14, wherein based on a determination that the indicator in the bitstream indicates that each texture coordinate on the first side of the mesh is identical to a corresponding texture coordinate on the second side of the mesh, the second texture coordinate is determined based on adding an offset to the first texture coordinate.

16. A method performed by at least one processor of a decoder, the method comprising:
receiving a bitstream comprising an encoded texture coordinates on a first side of a mesh divided according to a symmetry plane that divides the mesh into the first side and a second side opposite to the first side;
decoding each encoded texture coordinate on the first side of the mesh;
decoding an indicator included in the bitstream that is set to a value that indicates whether the first side of the mesh exhibits a degree of texture symmetry with the second side of the mesh that satisfies a condition; and
decoding, based on the decoded indicator, a second texture coordinate on the second side of the mesh based on a decoded first texture coordinate on the first side of the mesh.

17. The method according to claim 16, wherein the condition specifies that each texture coordinate on the first side of the mesh is identical to a corresponding texture coordinate on the second side of the mesh.

18. The method according to claim 17, wherein based on a determination that the indicated indicates that the condition is not satisfied, the decoding each texture coordinate on the second side of the mesh is performed in accordance with an inter-prediction method in which the second texture coordinate on the second side of the mesh is processed as a first frame and the first texture coordinate is processed as a second frame and wherein the second texture coordinate is predicted based on the first texture coordinate.

19. The method according to claim 17, wherein based on a determination that the indicator indicates that the condition is not satisfied, the decoding each texture coordinate on the second side of the mesh comprises:
   decoding an offset included in the bitstream, the offset specifying a location of the second texture coordinate; and
   predicting the second texture coordinate based on the first texture coordinate.

20. The method according to claim 17, wherein based on a determination that the indicator indicates that the condition is satisfied, the decoding the second texture coordinate comprises copying a texture of a corresponding first decoded texture coordinate.

* * * * *